United States Patent [19]
Nalder

[11] Patent Number: 5,999,175
[45] Date of Patent: Dec. 7, 1999

[54] USER INTERFACE FOR SELECTING SCANNER SENSITIVITY

[75] Inventor: Gregory T. Nalder, Nampa, Id.

[73] Assignee: Hewlett-Packard Co., Palo Alto, Calif.

[21] Appl. No.: 08/888,211

[22] Filed: Jul. 3, 1997

[51] Int. Cl.⁶ .............................. G06F 3/14; H04N 1/407
[52] U.S. Cl. .................. 345/339; 345/432; 345/970; 345/352; 358/455; 399/138
[58] Field of Search ..................... 345/339, 432, 345/431, 352, 354, 970, 965, 156, 341, 348; 399/81, 158, 51, 52, 45, 138; 358/518, 521, 447, 455, 465, 461

[56] References Cited

U.S. PATENT DOCUMENTS

| | | | |
|---|---|---|---|
| 5,012,333 | 4/1991 | Lee et al. | 358/520 |
| 5,208,903 | 5/1993 | Curry | 345/431 |
| 5,377,013 | 12/1994 | Oka et al. | 358/518 X |
| 5,424,754 | 6/1995 | Bar et al. | 345/431 X |
| 5,717,838 | 2/1998 | LeClair | 358/520 X |
| 5,832,133 | 11/1998 | Smith | 358/518 X |

*Primary Examiner*—Raymond J. Bayerl
*Attorney, Agent, or Firm*—Anthony J. Baca

[57] ABSTRACT

An intuitive menu for visual displays is provided. Modern complex printed pages consist of several printed objects which may be overlaid upon each other. Examples are a main object such as text, a background such as a picture, colored or gray scale field, and the texture or watermark of the page itself. When duplicating such a page using a scanner, a user must choose the relative visibility of the background and watermark with respect to the main object. The invention provides a series of choices representing the relative visibility of the printed objects. Several images are presented to the user who selects the image most closely representing the desired output.

10 Claims, 7 Drawing Sheets

USER INTERFACE FOR SELECTING SCANNER SENSITIVITY

FIELD OF THE INVENTION

The present invention relates to user interfaces. In particular to operator control panels such as those implemented on computer displays or flat panel screens, image scanners and photocopiers.

BACKGROUND OF THE INVENTION

Photocopiers, fax machines, and scanners have many user interfaces. One example is a control to vary the darkness of the copy. The control may be labeled "lighter" or "darker" or use simple light and dark symbols to communicate to the users what the output will look like. However, computer or printed images are becoming more complicated. They may have gray scale images, and subtle backgrounds as well as text. Consequently, simple controls do not adequately communicate to the user how the resulting output will appear. There is a need therefore, for a simple control which can better communicate to the user the appearance of the expected output.

Photocopiers, fax machines, and scanners have many similarities. A major similarity is that they begin their process with an original image, typically on paper, and convert it to some intermediate electrical form prior to its ultimate reproduction. The reproduction is local in the case of a photocopier and remote, usually using telephone lines, in the case of the fax machine. A scanner is a device that encodes an original image into some type of electrical signal which is then passed to another device for display such as on a computer, processing such as enhancement, storage, or reproduction. A scanner is a part of most modern photocopiers and fax machines. Therefore, in the following discussion, the word scanner can also be understood to mean that component of a photocopier or fax machine that converts an original image to some intermediate electrical form. Some scanners convert the light and dark areas of the original image into a continuously variable voltage or frequency signal and then use this voltage or frequency to control the reproduction of a copy. A continuously variable signal such as this is called an analog signal. Many scanners produce a digital output instead of an analog output. A digital output consists of a number of discrete steps. A common example is encoding a digital signal in eight binary bits which can represent a value ranging from 0 to 255. Although this might appear as very limiting compared to a continuously variable analog signal, there are major advantages. A digital signal is more suited than analog to computer storage, mathematical manipulation or regeneration. This discussion uses digital examples since digital signals are more common in scanners today. However, the present invention also is well suited for use in those applications which employ analog signals.

Many times there is a need to manipulate an intermediate electrical signal created by a scanner. This manipulation can lighten or darken the ultimate reproduction, or use more sophisticated mathematical methods to enhance various aspects of the reproduction. A common example familiar to photocopier users is the light/dark adjustment on the photocopier control panel. Typical types of manipulation are introduced with a concept called a tone map.

A tone map is a graphical representation of a transformation that takes a tonal input and converts it to an output. In the tone map of FIG. 1, the input axis 10 and the output axis 11 both range from 0 to 255. This is a common range since 0 to 255 can be represented in eight binary bits. FIG. 1 represents an identity tone map where an input of N (0<= N=<255) maps to an output of N, indicated by the diagonal line 12. Values of N between 0 and 255 generally represent shades of gray from black (=0) to white (=255). Given the tone map of FIG. 1, an image from a scanner which passes through the tone map to a printer, in theory produces the same shades as the scanned original, within the limitations of the scanning and printing process. The characteristic of maintaining the same shade from input to output is illustrated in FIG. 1. A shade of medium gray, having an input value of 128 indicated by vertical line 13 is transformed to an output value of 128 indicated by horizontal line 14. One skilled in the art will recognize that other digital ranges larger or smaller as well as analog ranges are also possible. While this discussion deals only with tone maps for gray scale from black to white, all the concepts are readily applied to color as well. In the case of color, there are three tone maps, for a Red, Green Blue system (RGB) or four tone maps for a Yellow, Magenta, Cyan, black (YMCK) system.

FIGS. 2 and 3 show modifications to the straight line transformation of FIG. 1. The line 12 in both FIGS. shows the original identity transformation of FIG. 1, while the heavier lines 20 and 30 represent new transformations based on brightness. FIG. 2 corresponds to a brightness transformation with the brightness function reduced so that the output is darker than the original input. The transformation depicted in FIG. 2 is useful for reducing the brightness of originals that are too light. For example, the tone map of FIG. 2 transforms an input of 128 indicated by line 23 to an output of 64 indicated by line 24. Thus, the tone map of FIG. 2 transforms gray (128) to a darker gray (64). FIG. 3 represents the opposite situation. The transformation of FIG. 3 has the effect of lightening an input image. This corresponds to increasing a brightness control. For example, the transformation of FIG. 3 transforms an input of 128 indicated by line 33 to an output of 192 indicated by line 34. Thus, the tone map of FIG. 3 transforms gray (128) to a lighter gray (192).

FIGS. 4 and 5 show modifications to the straight line transformation of FIG. 1. The light line in both FIGS. 12 shows the original identity transformation of FIG. 1, while the heavier lines 40 and 50 represent new transformations based on contrast. The transformation of FIG. 4 accepts an input range of 0 to 255, but only outputs a range of about 50 to 200. This, in effect, compresses the gray scale tones to output a low contrast image. In a low contrast transformation, several input gray scale values get mapped into a single output gray scale value resulting in a loss of fine shading detail. Conversely, FIG. 5 represents a high contrast transformation. The input range from about 96 to 160 produces an output range of about 60 to 212. This accomplishes more than a two to one expansion of the input range of 65 points to an output range of 153 points. Such an expansion produces a high contrast transformation that emphasizes the input range around the center at the expense of the ranges at the high and low ends of the input scale. A high contrast transformation like this is useful when there is a need to amplify the tonal differences in a certain input range of the image.

FIGS. 2, 3 and 5 also illustrate another type of transformation called clipping. Clipping occurs when the line representing the transformation becomes horizontal. FIGS. 6 and 7 demonstrate the two types of clipping called white clipping and black clipping respectively. The transformation of FIG. 6 accepts an input range of 0 to 255, but any input from 193 to 255 results in an output of 255. This represents a compression of the input values from 193 to 255 and an expansion of the tones from 0 to 192. white clip is useful for inputs where the lighter shades from 193 to 255 do not carry any useful information. For example, in other scanning situations such as photocopy or fax, white clip can clean up the background associated with the imperfections in the original. Conversely, FIG. 7 represents a black clip transformation. The transformation of FIG. 7 accepts an input range of 0 to 255, but any input from 0 to 63 results in an output of 0. This represents a compression of the input values from 0 to 63 and an expansion of the tones from 64 to 255. Black clip is useful for inputs where the darker shades from 0 to 63 do not carry any useful information. For example, in other scanning situations such as photocopy or fax, black clip can convert the darker tones ranging from 0 to 63 of an original to black, and expand the dynamic range of the lighter tones from 64 to 255.

FIGS. 8 and 9 show example transformations of low and high gamma respectively. In FIG. 8 lower input values from 0 to 64 all generate an output very close to 0. This has an effect of compressing the darker shades more to black. The values of 192 to 255 however, are mapped into values of 100 to 255. This has the effect of expanding and emphasizing the lighter shades. While the white and black clipping of FIGS. 6 and 7 or the contrast of FIG. 4 did not use all of the input range, the gamma function uses all of the input range, but maps it unequally to the output. FIG. 9 shows another example of this unequal emphasis. In FIG. 9 low input values near 0 are assigned output values from 0 to 63 thus making the darker shades lighter and emphasizing even small differences between black and the dark grays. The input values of 96 to 255 however, are mapped into output values of 192 to 255. This has the effect of compressing and de-emphasizing the differences among white and the lighter grays.

Brightness, contrast, white clip, black clip and gamma are interactive in that the adjustment of one value may affect the results of another value. Collectively, these parameters are herein referred to as transformation parameters.

SUMMARY OF THE INVENTION

The invention provides an intuitive menu to the user that displays several images to the user. Each image is a simulated output consisting of an object, a watermark and a background. Each image represents the effects of a transformation upon an input image. As the user adjusts the sensitivity from low to high, the simulated output images change. The user selects one simulated output, which represent the transformation desired.

The present invention is a method for selecting a transformation from multiple transformations of an input image. The method consists of the steps of displaying at least one image representing the selected transformation. The image consists of a background, a watermark, and an object. Finally, the user's selection is received.

To accomplish the present invention, there is further provided a method for prompting a user to make a selection of a transformation from multiple transformations. This method steps define multiple images, each having a background, a watermark and an object. Each of these images further represent one of the transformations. Next, an image representing a current transformation is displayed. Then the system waits for an indication from the user. If the indication is a first choice, the system accepts the current transformation as the selection. If the indication equals a second choice, the system displays an image representing a previous transformation, and defines the previous transformation to be the current transformation. Finally if the indication equals a third choice, the system displays an image representing a next transformation, and defines that next transformation to be the current transformation.

BRIEF DESCRIPTION OF THE DRAWINGS

A better understanding of the invention may be had from the consideration of the following detailed description taken in conjunction with the accompanying drawings in which.

DETAILED DESCRIPTION OF THE PREFERRED EMBODIMENT

Figure 1:
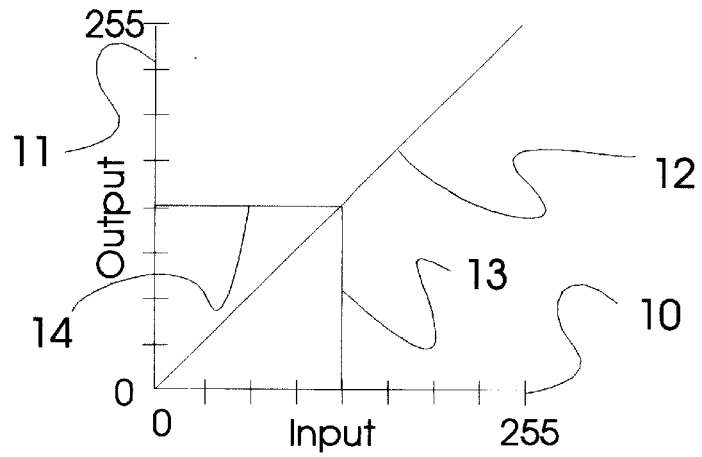
FIG. 1 shows a tone map of an identity transformation.

The present invention is not limited to a specific embodiment illustrated herein. As shown in the drawings for the purpose of illustration, the preferred embodiment of the present invention enables a user to view and select an image representing a scanner output. The invention can simulate the complexity and subtleties of modern images found on displays or printed pages. A user can view these simulated images and adjust a scanner prior to a scanning operation. Previous devices which presented the users with a simple lighter/darker control did not adequately communicate to the user the results of the scanning operation.

A computer menu according to the invention, provides multiple simulated samples of a test image. The samples vary by brightness, contrast, black clipping, white clipping and gamma. By selecting one of the simulated samples, the user provides the information necessary to set up the parameters of a scanner.

Figure 10:
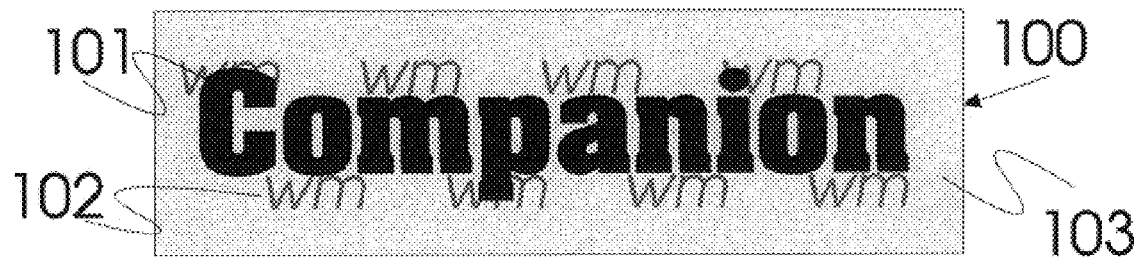
FIG. 10 shows an example input image.

FIG. 10 shows an IMAGE 100 which is a segment of a page. The page can be either a printed page or represented on a computer display. Note that there are three things visible. First the word "Companion" 101. This is the prominent feature on this segment and is herein referred to as an object. Other examples of objects are line art, photographs or other text. The object (or objects) are the main carriers of information to the reader of the printed page. Within FIG. 10 there is also visible a logo repeated across the segment. Here, the letters "wm" 102, although lighter than the object, are still visible. Logos such as this can be the results of a watermark added to the paper during manufacture or can be made with a lighter shade of printing. Collectively both cases of such lighter printing or watermark are herein referred to as the watermark. Finally, there is an even gray pattern 103 dispersed across the segment. In a printed page, this gray pattern could be the color of the paper itself, the texture of the paper or a shading added during the printing of the page. Regardless of the source, a background pattern, shading or paper color are herein referred to as the background.

Figure 6:
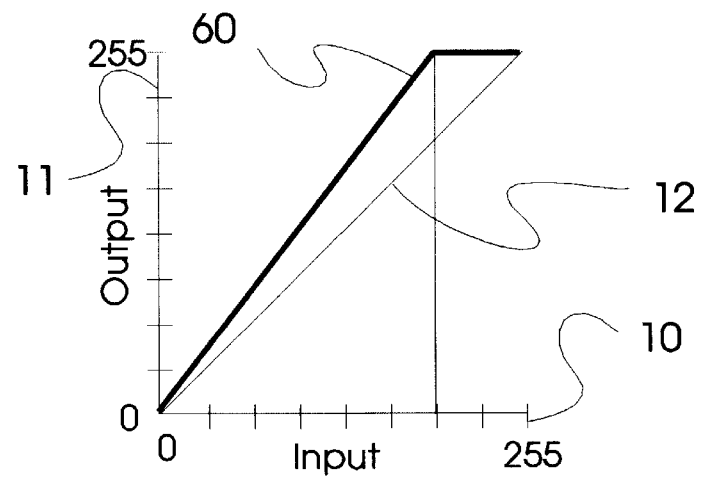
FIG. 6 shows a tone map of a white clip transformation.
Figure 7:
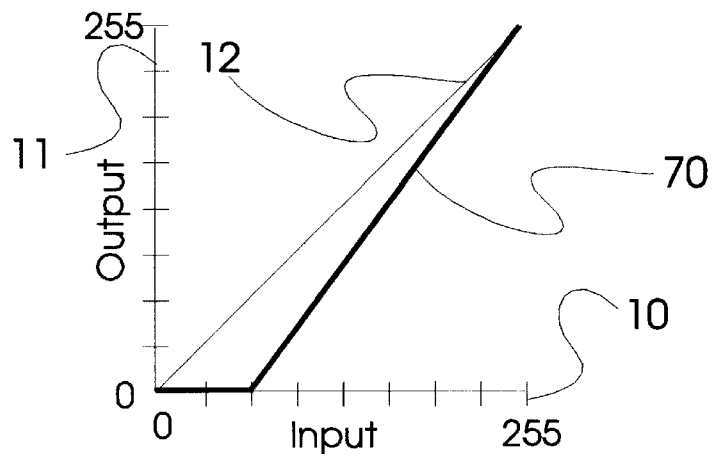
FIG. 7 shows a tone map of a black clip transformation.
Figure 8:
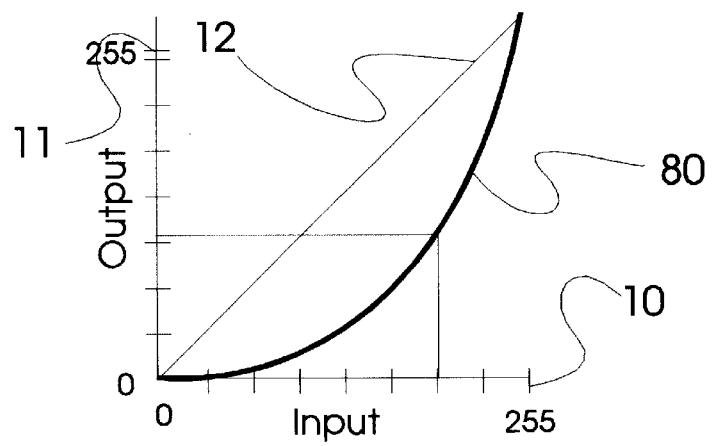
FIG. 8 shows a tone map of a low gamma transformation.
Figure 9:
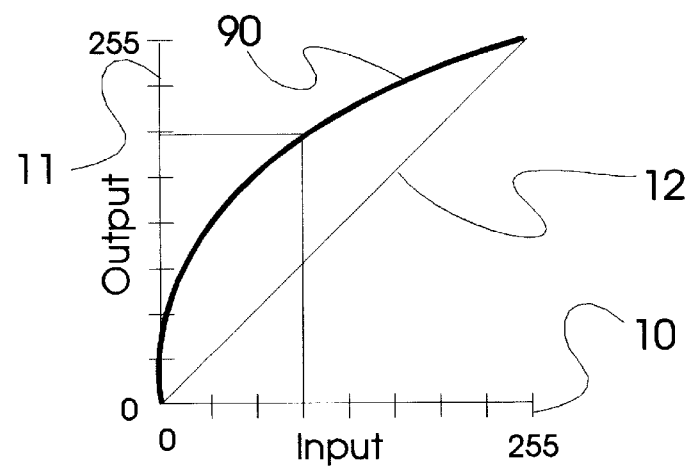
FIG. 9 shows a tone map of a high gamma transformation.
Figure 11:
FIG. 11 shows the example input image after white clip.

When a page is scanned to make either an electronic copy or a photocopy, the relative intensity of the three page components, OBJECT 101, WATERMARK 102 and BACKGROUND 103 can be controlled by a transformation. For example, the white clip transformation of FIG. 6 converts the input of FIG. 10 into an output represented by FIG. 11. In FIG. 11, the WATERMARK 102 of FIG. 10 is no longer visible. Also the BACKGROUND 103 has been transformed to white.

Figure 2:
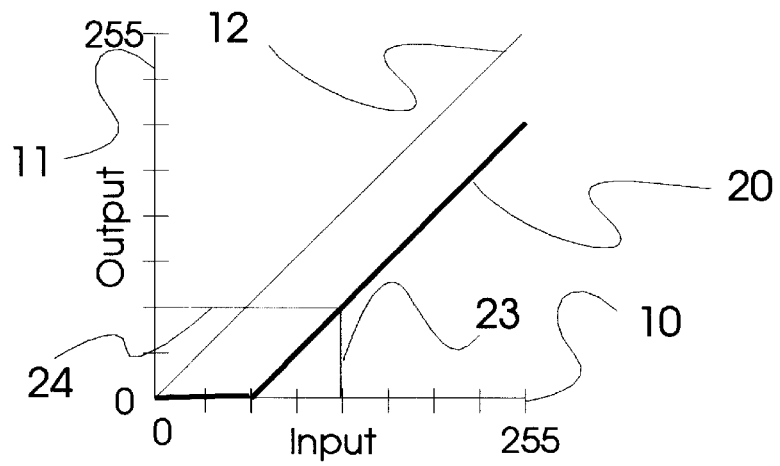
FIG. 2 shows a tone map of a low brightness transformation.
Figure 3:
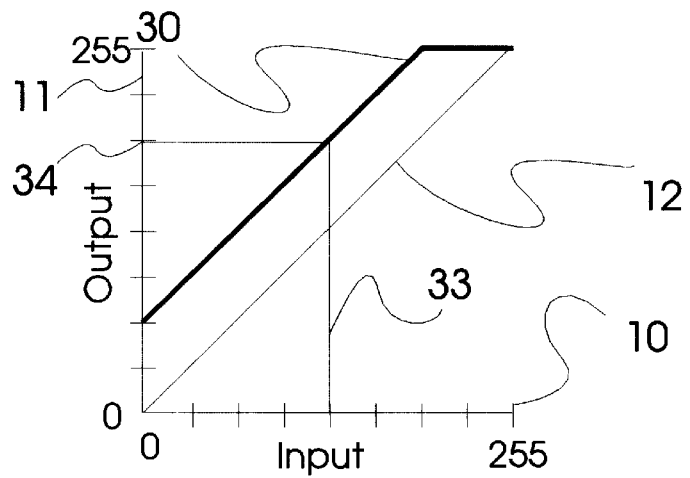
FIG. 3 shows a tone map of a high brightness transformation.
Figure 4:
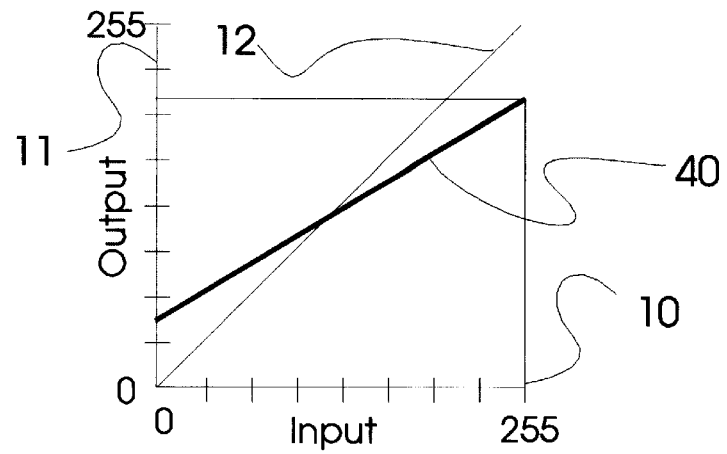
FIG. 4 shows a tone map of a low contrast transformation.
Figure 5:
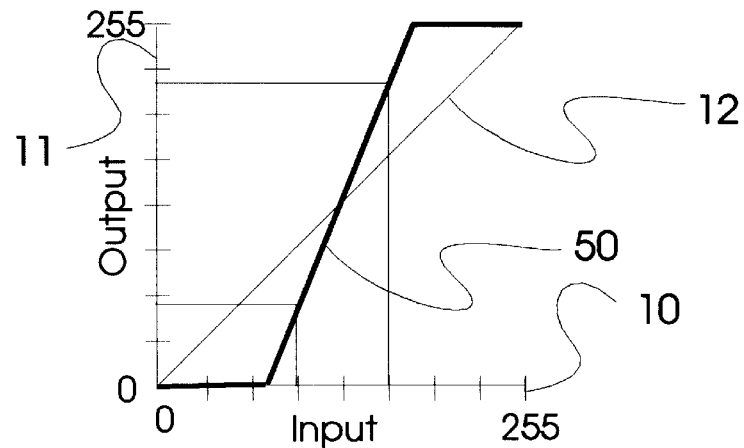
FIG. 5 shows a tone map of a high contrast transformation.
Figure 12:
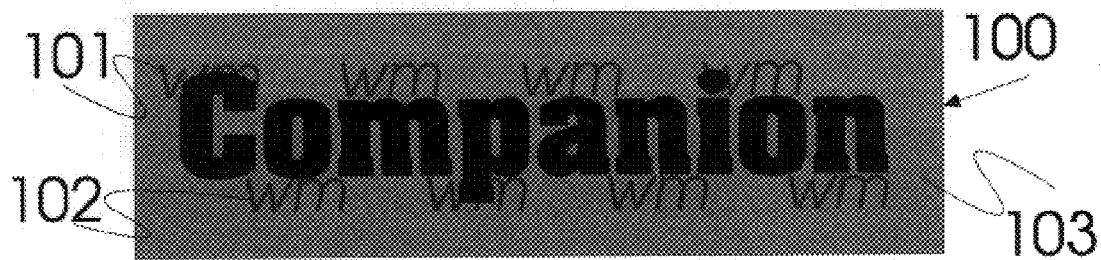
FIG. 12 shows the example input image after a low brightness transformation.

Conversely, if the BACKGROUND 103 and WATERMARK 102 are desired, the brightness function can be turned down to darken the overall output. FIG. 12 represents this situation. In FIG. 12 a low brightness transformation such as that of FIG. 2 was used to darken, and thus emphasize, both the WATERMARK 102 and the BACKGROUND 103. The OBJECT 101 which was already at a very dark level near 0, was not changed.

Figure 13:
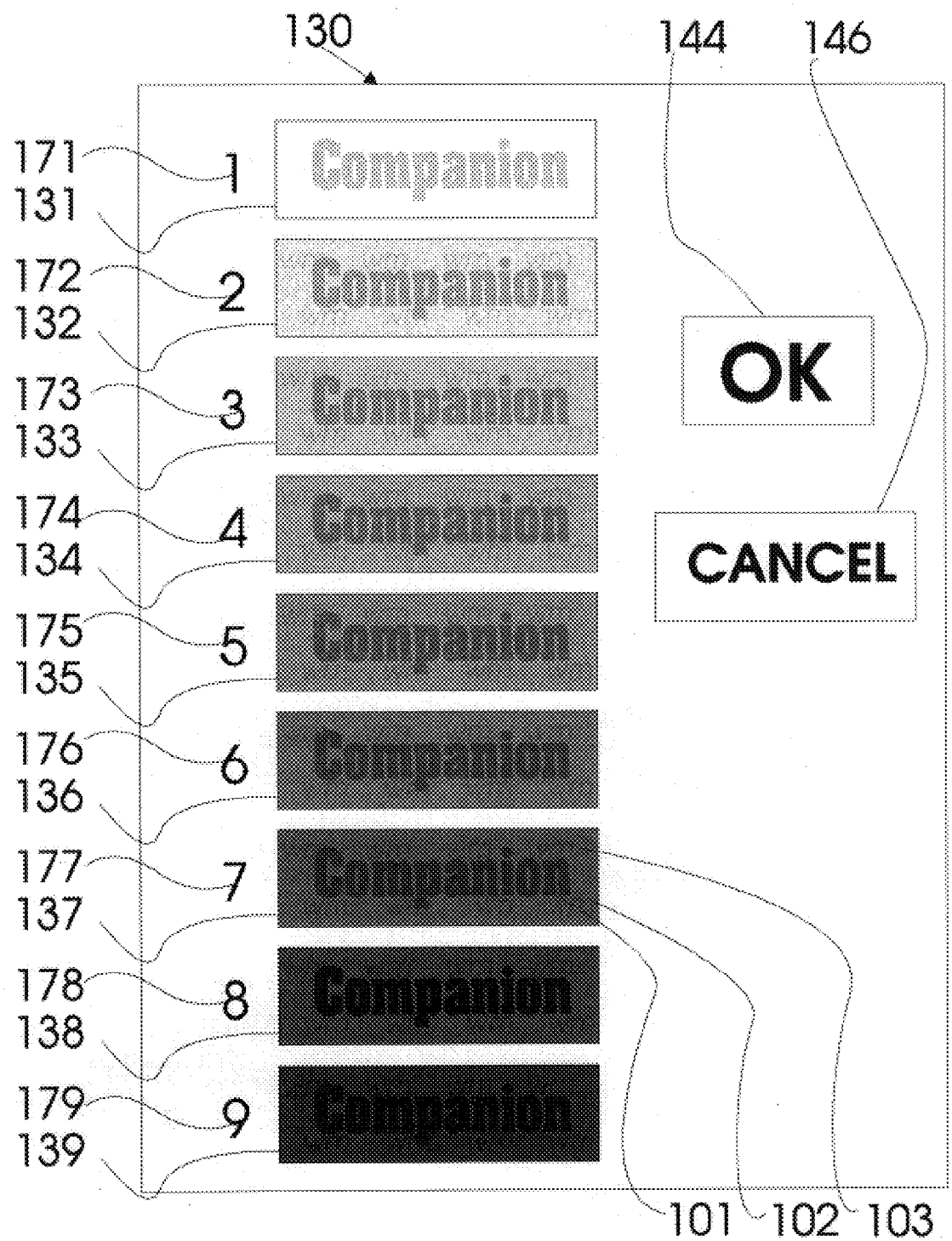
FIG. 13 shows a menu of images representing possible transformations.

The remainder of this discussion, uses the concepts of object, watermark and background to demonstrate the invention. An alternative embodiment in FIG. 13 shows a MENU 130 where nine images 131 through 139 represent the simulated outputs of nine different transformations. Each transformation is represented by a unique tone map (not shown) that maps input values to output values. Numerals from 1 to 9, (171–179), adjacent to images 131 through 139 are the sensitivities. A sensitivity is a conceptual way to specify a transformation without having to refer to its components such as brightness, contrast, white clip, black clip, or gamma. When the MENU 130 is presented to a user, the user selects one of the IMAGES 131 through 139. A selection can be indicated by highlighting or otherwise making obvious the selected image relative to the others. Methods of highlighting and selecting from a menu are known by one skilled in the art of writing user interfaces. The user then finalizes the selections and exits the IMAGE 130 by selecting the OK BUTTON 144. Users can leave the menu without making a selection by pressing the CANCEL BUTTON 146. The concepts of an OK button or a CANCEL button, are only one example of affirming or aborting a menu operation. Other methods such as double clicking with a mouse or closing a menu window are others. These and other methods are known to those skilled in the art of writing user interfaces. A software program then takes the chosen sensitivity and converts it to an input to output transformations.

Within the MENU 130 the user sees the WATERMARK 102 and BACKGROUND 103 of the image get progressively darker relative to the OBJECT 101 as the sensitivity is moved higher from 1 to 9. As needs of users vary, a user who was only interested in preserving the object selects a lower sensitivity in order to delete or lighten the watermark and background. Conversely, a user desiring to preserve or emphasize the watermark or background, selects a higher sensitivity. Unlike the traditional "lighter"/"darker" setting of the prior art, the invention communicates to the user, the intended effect of the chosen sensitivity.

Figure 14:
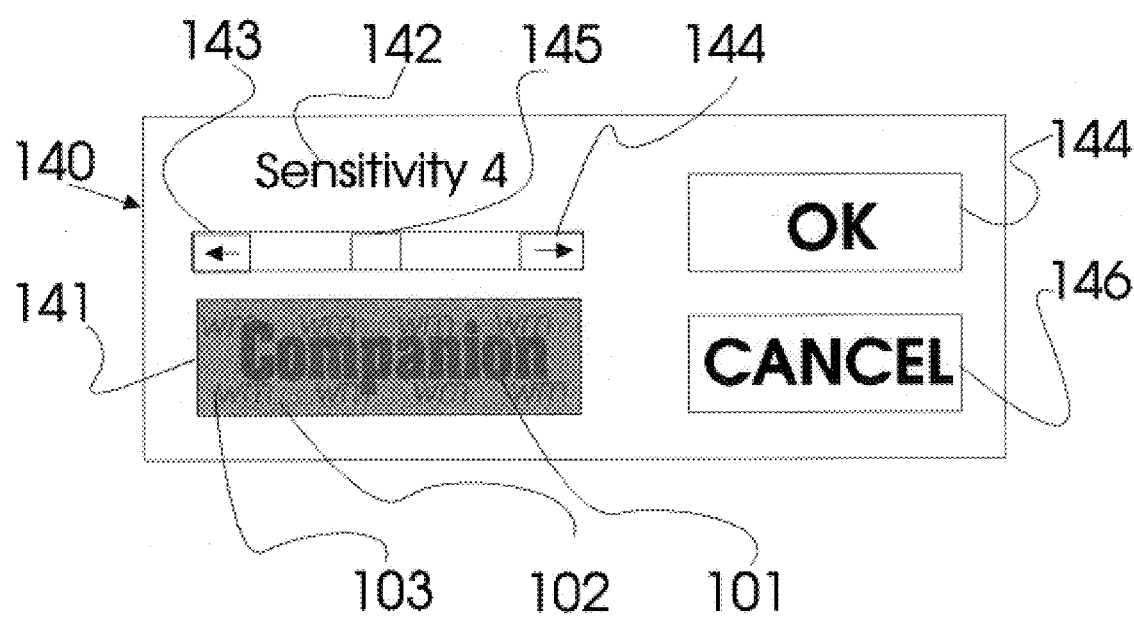
FIG. 14 shows a menu of images for selecting possible transformations.

While FIG. 13 showed the images contemporaneously, FIG. 14 shows the preferred embodiment where only one image at a time is displayed. The MENU 140 has a single DISPLAY AREA 141 for the images. SELECTION BUTTONS 143, 144 allow the user to scroll through the same image/transformation selections as in FIG. 13, but only view one image at a time. The SLIDER BAR 145 indicates the value of the selection relative to those available, while the SENSITIVITY 142 reads out the value of the current selection. As in FIG. 13, the user finalizes a selection by activating the OK BUTTON 144 or canceling a selection by activating the CANCEL BUTTON 146. Activation can be accomplished by a mouse double click or other methods known to one skilled in the art of designing graphical user interfaces.

The menu of the preferred embodiment allows a user to identify an example image that most closely represents the desired output. Once the user identifies and selects an example image from a menu such as depicted in FIG. 14, software programs complete steps to implement the desired output. These software steps work as follows:

1) Each sample image of the menu has a unique sensitivity
2) Each sensitivity corresponds to a lookup table.
3) Each lookup table maps a set of inputs to a set of outputs to implement a transformation such as the type depicted by the tone maps in FIGS. 1 through 9.

Figure 15:
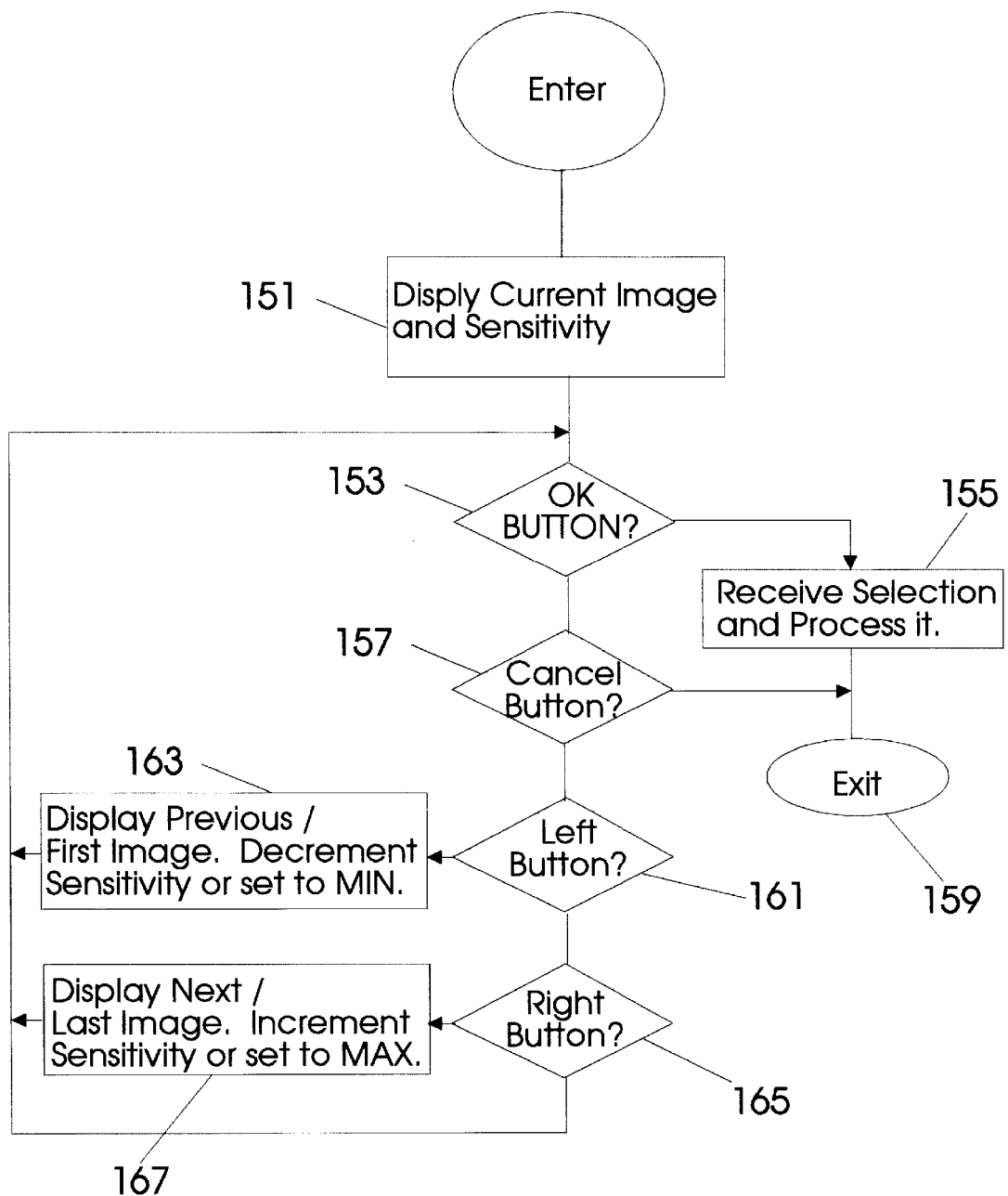
FIG. 15 shows the flow chart for operating the menu of FIG. 14.

FIG. 15 shows the flowchart of software to implement the menu of FIG. 14. Once the user enters the menu, the STARTUP PRESENTATION BLOCK 151 presents the current sensitivity or a default if no sensitivity had been previously chosen. If the user activates the OK BUTTON 144 of the menu, the OK QUERY 153 recognizes the selection and performs SELECTION PROCESSING 155 prior to taking the software EXIT (159). If at any time during the menu operation, the user activates the CANCEL BUTTON 146 the CANCEL QUERY 157 directs an immediate EXIT 159 without any selection process. The LEFT BUTTON QUERY 161 activates the PREVIOUS/FIRST BLOCK 163 to display the previous or first sensitivity and its associated image. The RIGHT BUTTON QUERY 165 directs the NEXT/LAST BLOCK 167 to display the next sensitivity and its associated image.

There are a variety of ways to implement the PREVIOUS/FIRST BLOCK 163 or the NEXT/LAST BLOCK167. These two blocks allow the user to move or scroll through the available example images. When the first or last example image is reached during scrolling process, the controlling software can stop at the first or last image or wrap around to last or first image. In the wrap around implementation, advancing past the last example image starts at the beginning of the list and displays the first example image. Similarly, advancing past the first example image displays the last image. These are implementation variations within the preferred embodiment.

The selection processing block 155 determines the selected sensitivity and passes it to other programs. Other programs receive the sensitivity and use it as an index into lookup tables. The use of lookup tables follows.

Within the computer software which runs the menu system, each sensitivity identifies a particular transformation. Within the preferred embodiment of the present invention, each sensitivity points to its own look up table. Thus for a menu such as the menu of FIG. 13 or FIG. 14, there are nine look up tables, one for each of the nine sensitivities. Table 1 shows three of the nine look up tables labeled Table 1A through 1C. Look up tables 1A and 1B correspond to sensitivities 1 and 2 respectively, while Table 1C corresponds to sensitivity with the value of 9.

Suppose, for example a user, via the menu of FIG. 14 chose an example image that represented the desired output image. Suppose further that the sensitivity of this example image was 2. A software program uses this sensitivity of 2 to access lookup table 1B in Table 1. Table 1B, as all the look up tables in Table 1, has 256 entries ranging from 0 to 255. Other programs take the information stored in Table 1B and use it to build a transformation. Still other programs use this transformation to manipulate images in order to darken, lighten or otherwise convert them to outputs more closely resembling the selected example image of the menu.

The construction or filling of the lookup tables with data is accomplished in a number of ways. Some methods of constructing lookup tables, known to one of ordinary skill are:

1) Heuristic construction of tone maps and the encoding of the tone maps to lookup tables.

2) Mathematical modeling of the input/output process and loading the lookup tables from the solutions to the mathematical functions.

3) A combination of steps of 1 and 2 above.

Although these examples used input and output ranges of 0 to 255, other larger or smaller ranges are possible. The lookup tables are made with the correct number of entries to suit the data range.

TABLE 1A

| Sensitivity = 1 | |
|---|---|
| INPUT | OUTPUT |
| 0 | 23 |
| 1 | 25 |
| 2 | 56 |
| 3 | 78 |
| . | |
| . | |
| . | |
| 253 | 253 |
| 254 | 254 |
| 255 | 255 |

TABLE 1B

| Sensitivity = 2 | |
|---|---|
| INPUT | OUTPUT |
| 0 | 20 |
| 1 | 22 |
| 2 | 24 |
| 3 | 45 |
| . | |
| . | |
| . | |
| 253 | 250 |
| 254 | 252 |
| 255 | 253 |

TABLE 1C

| Sensitivity = 9 | |
|---|---|
| INPUT | OUTPUT |
| 0 | 0 |
| 1 | 0 |
| 2 | 0 |
| 3 | 0 |
| . | |
| . | |
| . | |

TABLE 1C-continued

| Sensitivity = 9 | |
|---|---|
| INPUT | OUTPUT |
| 253 | 192 |
| 254 | 196 |
| 255 | 200 |

TABLE 1 does not require the use of the intermediate transformation parameters or a mathematical equation, but uses a direct lookup method from the table identified by the sensitivity. Table 2 shows another embodiment where each transformation is specified with the transformation parameters: brightness, contrast, white clip, black clip and gamma. Software uses the sensitivity selected by the user as an index into TABLE 2. From TABLE 2 the software then retrieves the transformation parameters and uses them to generate the transformation via a mathematical equation. The details of such a mathematical equation depend upon the printing technology used and are know to one of ordinary skill in that art. From such an equation a tone map can be constructed as follows:

$$\text{Output} = \text{function}(\text{input}, b, c, w, k, g)$$

In the equation above, the input and output are the input and output values of the tone map which represents the desired transformation. Variables b, c, w, k and g are constants or even functions accessed from Table 2 by the selected sensitivity. Suppose, for example, a user via the menu of FIG. 14 selects an image with an associated sensitivity of 2. A software program uses the sensitivity of 2 and indexes into the second row of Table 2 providing the values b2, c2, w2, k2 and g2.

In a further embodiment, the values within Table 2 are not associated with brightness, contrast, white clip, black clip or gamma, but actual print mechanism settings. Such print mechanism settings depend upon the print technology used. Examples are, developer voltages and laser modulation for electrophotographic printing, and print head voltage, current, frequency and dwell time for ink jet or impact printing. This last embodiment skips the intermediate steps of tone map creation and directly controls the printing process.

TABLE 2

| Sensitivity | Brightness | Contrast | White Clip | Black Clip | Gamma |
|---|---|---|---|---|---|
| 1 | b1 | c1 | w1 | k1 | g1 |
| 2 | b2 | c2 | w2 | k2 | g2 |
| 3 | b3 | c3 | w3 | k3 | g3 |
| 4 | b4 | c4 | w4 | k4 | g4 |
| 5 | b5 | c5 | w5 | k5 | g5 |
| 6 | b6 | c6 | w6 | k6 | g6 |
| 7 | b7 | c7 | w7 | k7 | g7 |
| 8 | b8 | c8 | w8 | k8 | g8 |
| 9 | b9 | c9 | w9 | k9 | g9 |

Although the preferred embodiment of the invention has been illustrated, and that form described, it is readily apparent to those skilled in the art that various modifications may be made therein without departing from the spirit of the invention or from the scope of the appended claims.

What is claimed is:

1. A method for selecting a transformation from a plurality of transformations of an input image, said method comprising the steps of:

a. displaying at least one simulated image, said simulated image representing said selected transformation, said simulated image comprising:
  a background;
  a watermark; and
  an object;
b. receiving said selection
c. scanning said input image; and
d. performing said selected transformation on said scanned input image.

2. The method claimed in claim 1, further comprising the step of:
  calculating transformation parameters from said selection.

3. The method claimed in claim 2, wherein said transformation parameters comprise:
  a brightness parameter;
  a contrast parameter;
  a white clip parameter; and
  a black clip parameter.

4. The method claimed in claim 2, wherein said transformation parameters comprise:
  a gamma parameter;
  a white clip parameter; and
  a black clip parameter.

5. A menu for prompting a user to select a transformation from a plurality of transformations to perform on an input image, said menu comprising:
  a. a plurality of simulated images, each simulated image of said plurality visually representing one of said transformations, said each simulated image of said plurality comprising:
    a background;
    a watermark; and
    an object;
  b. means for receiving said selection;
  c. means for scanning said input image; and
  d. means for performing said selected transformation on said canned input image.

6. The menu claimed in claim 5 further comprising:
  means for scrolling through said plurality of simulated images.

7. The menu claimed in claim 5, wherein said plurality of simulated images are presented contemporaneously within said menu.

8. The menu claimed in claim 5 further comprising:
  a progression within said plurality of simulated images where said background and said watermark become progressively visible with respect to said object.

9. A method for prompting a user to make a selection of a transformation from a plurality of transformations, said method comprising the steps comprising:
  a. defining a plurality of simulated images, each member of said plurality having a background, a watermark and an object, each of said simulated images further representing one of said plurality of transformations;
  b. displaying a simulated image representing a current transformation from said plurality of transformations;
  c. waiting for an indication from the user;
  d. if said indication equals a first choice, accepting said current transformation as said selection;
  e. if said indication equals a second choice, displaying a simulated image representing a previous transformation, and defining said previous transformation to be said current transformation; and
  f. if said indication equals a third choice, displaying a simulated image representing a next transformation, and defining said next transformation to be said current transformation.

10. The method claimed in claim 9 further comprising the step of:
  if said indication equals a fourth choice, ceasing all displays associated with said method.

* * * * *